May 12, 1931.  W. S. NICHOLS  1,804,703

LAWN MOWER

Filed Feb. 10, 1930

Patented May 12, 1931

1,804,703

UNITED STATES PATENT OFFICE

WINFIELD S. NICHOLS, OF ROCKFORD, ILLINOIS

LAWN MOWER

Application filed February 10, 1930. Serial No. 427,121.

This invention relates to lawn mowers. The principal object of my invention is to provide a lawn mower having an adjustable mounting for the cutter bar that will enable even a mechanically unskilled person to easily and quickly set the cutter bar in true alignment with the reel and with exactly the proper clearance for good cutting.

The salient feature of this invention consists in the mounting of the opposite ends of the cutter bar on trunnions on a pair of opposed short crank members mounted for oscillatory adjustment on the side frames, whereby to permit the cutter bar to be adjusted bodily to bring the longitudinal axis through the trunnions into the proper plane where the edge of the cutter bar is in absolute end to end alignment with the reel. Another feature is that of providing a simple means for tilting the cutter bar on the trunnions to secure precisely the proper clearance between the cutter bar and the reel for good cutting, the said means consisting of an eccentric rotatably adjustable on a cross rod fixed to the side frames behind the cutter bar and disposed in a yoke extending rearwardly from the middle of the cutter bar.

In the accompanying drawing—

The same reference numerals are applied to corresponding parts.

Figure 1:
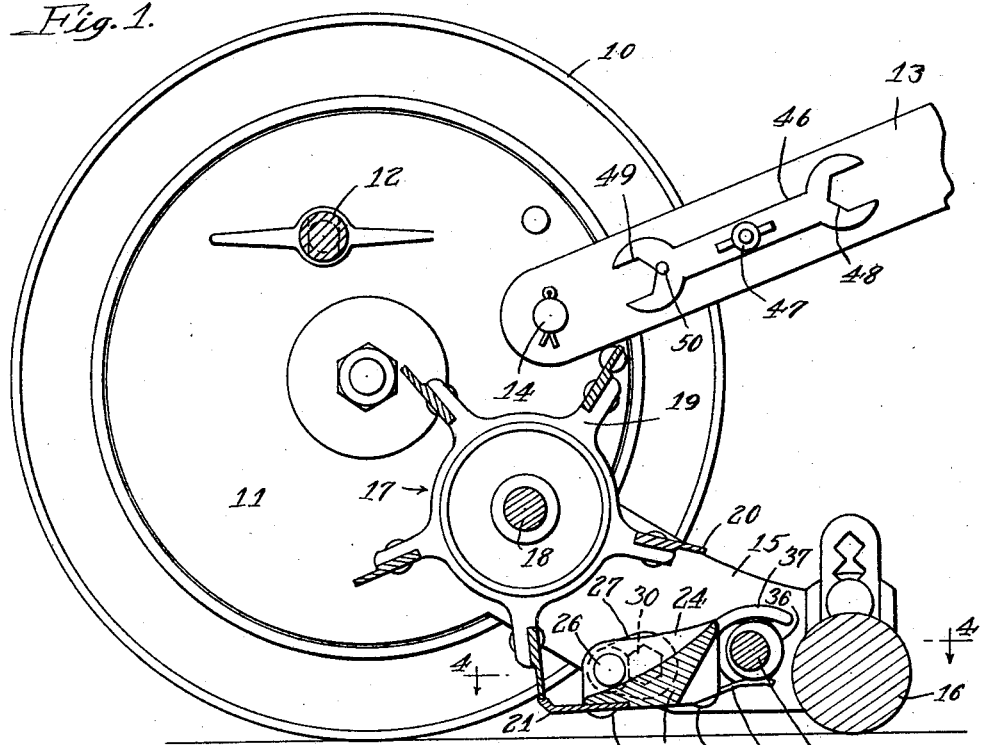
Figure 1 is a vertical section through a lawn mower embodying my invention.

The lawn mower illustrated is of generally conventional design having drive wheels 10 mounted in a usual way on side frames 11. The latter are fastened together by a tie bar 12, often referred to as the brush bar, and have the fork 13 of the operating handle pivoted thereto at 14. Bracket portions 15 are cast preferably integral with the side frames 11, a wooden ground roller 16 being suitably mounted thereon near the free ends thereof, appreciably to the rear of the reel 17. A grass catcher may be attached to the frame of the lawn mower in the usual way. So much for a general description of the lawn mower in connection with which I have chosen to illustrate my improvements.

Figure 2:
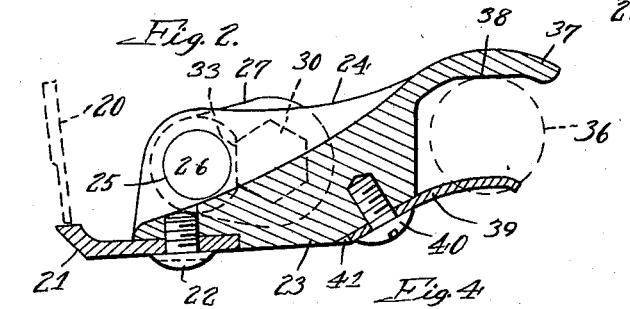
Fig. 2 is an isolated enlarged sectional detail of the cutter bar.
Figure 3:
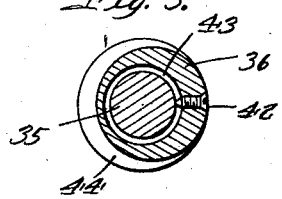
Fig. 3 is a similar view of the eccentric used in connection with the cutter bar for the clearance adjustment.
Figure 4:
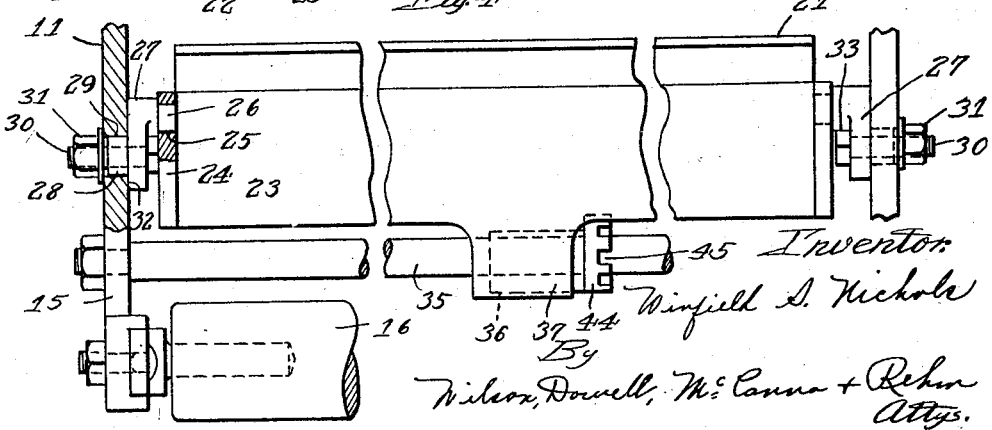
Fig. 4 is a plan view taken on the line 4—4 of Figure 1, portions of the parts being broken away to conserve space and permit showing the parts on a larger scale.

The reel 17 has the shaft 18 thereof suitably received in anti-friction bearings on the side frames 11, where pinions mounted on the free ends thereof mesh with internal gears in the wheels 10 in the usual way to transmit the drive from the wheels to the reel through over-running clutches. Spiders 19 on the shaft 18 have the usual curved blades 20 carried on the outer ends of the arms thereof and arranged to cooperate with a straight-edged cutter bar 21. The latter is suitably secured by means of screws 22 onto a holder 23 which is in the form of a casting extending the full length thereof and provided with parallel flanges 24 at opposite ends thereof. Bearing holes 25 are provided in these flanges for the reception of trunnions 26, with reference to which the cutter bar is arranged to fulcrum in the tilting adjustment of the cutter bar made to secure the proper clearance between the cutter bar and the reel, as will presently appear. The trunnions 26 are provided on crank members 27 at the same short radius with reference to hollow cylindrical bearing bosses 28 that are received in bearing holes 29 provided in the side frames 11. Bolts 30 extend through the bosses 28 and have nuts 31 threading on the outer ends thereof on the outside of the side frames 11 to hold the cranks 27 assembled on the side frames for oscillatory adjustment about the bearing bosses 28 as centers, and these bolts when tightened are arranged to clamp the cranks by their flat outer faces 32 onto the inner sides of the side frames. The faces 32 are large enough so that the cranks have sufficient bearing contact with the side frames to permit holding them firmly in adjusted position by merely tightening the nuts 31. It will be observed in Fig. 2 that the heads of the bolts 30 are hexagonal and are arranged to have one flat side thereof engage a shoulder 33 on the cranks so as to hold the bolts against turning no matter how tightly the nuts 31 are drawn up. From this much description it should be evident that when the nuts 31 are loosened, the cranks 27 are free to oscillate. It is, therefore, a simple matter to bring the cutter bar 21 in end to end alignment with the reel by inverting the lawn mower and allowing the cutter bar to rest on the reel at or near its ends and then tightening the nuts 31. In other words, when the two cranks are loose, the cutter bar can be adjusted bodily, both ends at one time, as distinguished from one end at a time, permitted in other lawn mowers, as for example, those having eccentrics receiving trunnions at opposite ends of the cutter bar. Where eccentrics were provided, the radius of eccentricity was usually very small, a fraction of what is provided for in the present case, and the adjustment was in an orbit and not oscillatory, and it was the invariable rule to adjust one end of the cutter bar at a time because of the fact that the small radius of eccentricity would not permit of oscillation of the eccentrics by movement of the cutter bar. In short, the eccentrics did not permit of bodily adjustment of the cutter bar, both ends at a time, to bring it into end to end alignment with the reel. The bodily adjustment of the cutter bar in the manner stated obviously brings the trunnions 26 into position on a certain longitudinal axis with reference to which the cutter bar is then arranged to fulcrum in such slight tilting adjustment as is required to produce precisely the proper clearance between the cutter bar and the reel for good cutting. The clearance adjustment will now be described.

A cross rod 35 carried by the side frames 11 extends substantially parallel with the cutter bar between the latter and the roller 16 and in approximately the same horizontal plane with the holder 23 so as to be out of the way of the grass thrown rearwardly from the reel. This matter of avoiding any obstruction onto which the grass might catch is important, and it will presently appear how the clearance adjustment is incorporated advantageously to give a clear sweep from the cutter bar back over the roller 16 to the trailing grass catcher. An eccentric 36 is mounted on the rod 35 under a yoke 37 formed as a curved rearward projection on the holder 23 approximately at the middle of the back thereof, a flat true face 38 being preferably formed on the under face of said yoke to make line contact on the periphery of the eccentric 36 and thus permit of very accurate adjustment as will presently appear. A leaf spring 39 is fastened by means of a screw 40 in a groove 41 in the bottom of the holder 23 directly beneath the yoke 37 and bears with considerable pressure against the eccentric 36 on the diametrically opposite side from the flat bearing 38. It must be evident that, owing to the fact that the rod 35 is disposed almost three times as far away from the fulcrum axis at the trunnions 26 as the cutting edge of the cutter bar 21, a very fine adjustment of the clearance between the cutter bar and the reel can be made; an appreciable angular adjustment of the eccentric 36 on the rod 35 will produce a very slight change in the position of the cutter bar. This is, of course, essential because good cutting depends on an accurate clearance adjustment. The spring 39 affords ample friction to hold the eccentric 36 in adjusted position and there is obviously no load imposed on the eccentric sufficient to tend to turn it and to throw it out of adjustment. A screw 42 threaded in a radial hole in the eccentric 36 has the tapered inner end entered in an annular groove 43 provided in the rod 35 whereby to hold the eccentric 36 against endwise movement so that it is always in the same operative relation to the yoke 37 and spring 39. One end of the eccentric 36 is enlarged to provide a flange 44 preferably concentric with the rod 35 and the same is castellated to provide a series of notches 45 into which a tool can be entered to turn the eccentric. For example, a wrench 46 may be provided quickly detachably secured by a wing nut 47 onto the fork or the operating handle for the purpose of making this adjustment. The one end has jaws 48 for use in the tightening or loosening of the nuts 31 for the bolts 30, but the other end is provided with jaws 49 for reception of the rod 35 and a projecting nib to enter in one of the notches 45 so as to permit the turning of the eccentric in an obvious manner.

The invention is thought to be clearly understood from the foregoing description, all of the objects and advantages having been more or less thoroughly discussed. The following claims are drawn with a view to covering the specific construction disclosed as well as all legitimate modifications and adaptations.

I claim:

1. In a lawn mower, the combination with the frame, the reel, and the cutter bar, of supporting members in spaced relation to the reel axis mounted for oscillation on the frame at opposite ends of the cutter bar having the cutter bar pivotally supported thereon on a longitudinal axis parallel with its longitudinal cutting edge, and parallel with the pivotal axis of said members, means for releasably fastening said members so that both ends of the cutter bar may be adjusted simultaneously with respect to reel circle to position the cutter bar with its longitudinal axis in a predetermined desired plane and hold it in such adjusted position, and means for tilting the cutter bar about its longitudinal axis and holding it in adjusted position.

2. In a lawn mower, the combination with the frame, the reel, and the cutter bar, of a pair of coaxially disposed cranks in spaced relation to the reel axis mounted for oscillation in the frame at opposite ends of the cutter bar and reaching toward the reel and having the cutter bar pivotally supported on the free ends thereof on a longitudinal axis parallel with the longitudinal cutting edge thereof as well as parallel with the axis of said cranks, means for releasably securing the cranks rigidly to the frame so that both cranks may move simultaneously to adjust both ends of the cutter bar simultaneously with respect to the reel circle to bring its longitudinal axis in a predetermined desired plane, the said means being arranged when tightened to hold the cranks with the cutter bar in such adjusted position, and means for tilting the cutter bar about its longitudinal axis and holding it in adjusted position.

3. A structure as set forth in claim 2 wherein the cranks have flat sides arranged to bear against flat surfaces on the frame substantially the full length of the cranks, the said means for releasably securing the cranks to the frame being arranged to draw the flat sides of the cranks against the frame whereby to permit extremely fine adjustment of the cranks and the holding thereof in any adjusted position.

4. A structure as set forth in claim 2 wherein the cranks have hollow substantially cylindrical bearing bosses provided thereon received in bearing openings in the frame to support the cranks for oscillation, and wherein the means for releasably securing the cranks comprise screw threaded parts entered in said bosses and arranged when tightened to clamp the cranks in adjusted position.

5. A structure as set forth in claim 2 wherein the cranks have hollow substantially cylindrical bearing bosses thereon received in bearing openings provided in the frame to support the cranks for oscillation, the said cranks also having flat surfaces thereon arranged to bear against flat surfaces on the frame in any position of adjustment of said cranks, and wherein the means for releasably securing the cranks in adjusted position comprise bolts passed through the bearing bosses of said cranks to hold the bearing bosses in position in the bearing openings, and arranged when tightened to draw the flat surfaces of the cranks firmly into engagement with the flat surfaces on the frame to hold the cranks in adjusted position.

6. In a lawn mower, the combination with the frame and the cutter bar, of a pair of short cranks substantially coaxially disposed at opposite ends of the cutter bar for oscillation with respect to the frame and having the cutter bar pivotally supported on the free ends thereof on a longitudinal axis parallel with the longitudinal cutting edge, means on the pivotal axis of said cranks for clamping the same frictionally to the frame in adjusted position, whereby when said means is loosened both of the cranks are arranged to be adjusted simultaneously to adjust both ends of the cutter bar simultaneously to bring its longitudinal axis in a predetermined desired plane, and when said means is tightened the cranks are made rigid with the frame to hold the cutter bar in adjusted position, and means for tilting the cutter bar relative to the cranks about its longitudinal axis and holding it in adjusted position.

7. A structure as set forth in claim 6 wherein said cranks are provided with hollow substantially cylindrical bearing bosses projecting therefrom for reception in bearing openings provided in the frame, and wherein the means disposed on the pivotal axis for holding the cranks in adjusted position comprise threaded members entered in the hollow bearing bosses and arranged when tightened to frictionally clamp the cranks in adjusted position.

8. A structure as set forth in claim 6 wherein said cranks have hollow cylindrical bearing bosses projecting therefrom for reception in bearing openings provided in the frame, and wherein the means disposed on the pivotal axis for holding the cranks in adjusted position comprise headed bolts extended outwardly through the bearing bosses so that the threaded ends project outside the frame, the said bolts being held against turning at their headed ends and having nuts threading thereon outside the frame arranged when tightened to clamp the cranks frictionally in adjusted position.

9. In a lawn mower, the combination with the side frame members, the reel, and the cutter bar pivotally supported between them on a longitudinal axis parallel with its cutting edge, of an eccentrically mounted member on each frame member in spaced relation to the reel axis and each directly carrying one end of the cutter bar, the said members being arranged to be given oscillatory movement simultaneously by movement of the cutter bar to adjust the cutter bar relative to the reel circle and bring the longitudinal axis of the cutter bar into a predetermined desired plane.

10. In a lawn mower, the combination with the side frame members, the reel, and the cutter bar pivotally supported between them on a longitudinal axis parallel with its cutting edge, of an eccentrically mounted member on each frame member in spaced relation to the reel axis and each directly carrying one end of the cutter bar, the said members being arranged to be given oscillatory movement simultaneously by movement of the cutter bar to adjust the cutter bar relative to the reel circle and bring the longitudinal axis of the cutter bar into a predetermined desired plane, and an eccentrically mounted member carried by the frame members directly engaging the cutter bar only at one point and arranged when turned to tilt the cutter bar about its longitudinal axis.

11. In a lawn mower, the combination with the side frame members, the reel, and the cutter bar pivotally supported between them on a longitudinal axis parallel with its cutting edge, of an eccentrically mounted member on each frame member in spaced relation to the reel axis and each directly carrying one end of the cutter bar, the said members being arranged to be given oscillatory movement simultaneously by movement of the cutter bar to adjust the cutter bar relative to the reel circle and bring the longitudinal axis of the cutter bar into a predetermined desired plane, a cross rod carried by the frame members behind the cutter bar, and an eccentric thereon directly engaging the cutter bar only at one point intermediate the ends thereof and arranged when turned to tilt the cutter bar about its longitudinal axis.

12. In a lawn mower, the combination with the side frame members, the reel, and the cutter bar, of a holder for the cutter bar having vertical flanges at opposite ends thereof parallel with the side frame members, a pair of short cranks coaxially disposed on the side frame members and pivoted at one end on the side frame members for oscillatory movement, and having trunnions at the free ends thereof received in bearings holes provided in the aforesaid flanges, the said cranks being arranged to be swung about their pivots simultaneously by moving the cutter bar, and said cranks extending toward the reel whereby to dispose the trunnions close to the cutting edge of the cutter bar, means on the pivotal axis of said cranks for frictionally securing the same in adjusted position on the frame, and means cooperating with the holder at a point intermediate the ends thereof for tilting the same on said trunnions to adjust the clearance of the cutter bar with reference to the reel.

13. In a lawn mower, the combination with the side frame members, the reel, and the cutter bar, of a holder for the cutter bar having vertical flanges at opposite ends thereof parallel with the side frame members, a pair of short cranks coaxially disposed on the side frame members for oscillatory movement, and having trunnions at the free ends thereof received in bearing holes provided in the aforesaid flanges, the said cranks extending toward the reel whereby to dispose the trunnions close to the cutting edge of the cutter bar, means on the pivotal axis of said cranks for frictionally securing the same in adjusted position on the frame, a cross rod carried by the side frame members at a point behind the holder and consequently spaced appreciably with reference to the aforesaid trunnions, and an eccentric on said rod engaging a part rigid with the back of the holder at only a single point intermediate the ends of said holder arranged when turned to tilt the holder about said trunnions to adjust the clearance of the cutter bar relative to the reel.

14. In a lawn mower, the combination with the frame and the cutter bar pivotally supported thereon on a longitudinal axis parallel with its cutting edge, of a cross rod on said frame parallel with the cutter bar and an eccentric on said rod directly engaging the cutter bar at a single point and arranged when turned to tilt the cutter bar about its longitudinal axis.

15. A structure as set forth in claim 14 wherein the cutter bar has a holder providing a bearing surface for engagement with the periphery of said eccentric and a leaf spring secured to said holder and pressing against the eccentric at a point opposite the aforesaid bearing surface whereby yieldingly to hold the eccentric against turning out of adjusted position.

16. In a lawn mower, the combination with the frame, and a cutter bar pivotally mounted therein on the longitudinal axis parallel with the cutting edge thereof, of a longitudinal member extending rearwardly from the cutter bar and having a fork at the rear thereof, and an eccentrically mounted member received in said fork and arranged when turned to tilt the cutter bar about its longitudinal axis, one side of the fork being rigid with said member providing a bearing surface for engagement with the eccentric, and the other side of the fork being yielding and bearing against the eccentric on the opposite side thereof, whereby the eccentric is yieldingly held against turning out of adjusted position.

17. A structure as set forth in claim 16 wherein the one side of the fork comprises a flat leaf spring received in a recess in said member whereby the same is held against turning out of alignment with the other side of the fork, said leaf spring having means for securing the same in said recess.

18. A structure as set forth in claim 16 including a cross rod, the eccentrically mounted member comprising an eccentric rotatably mounted on said rod and disposed in said fork.

19. A structure as set forth in claim 16 including a cross rod, the eccentrically mounted member comprising an eccentric rotatably mounted on said rod and disposed in said fork, said structure further including means for holding said eccentric against endwise movement on said rod.

20. A structure as set forth in claim 16 including a cross rod, the eccentrically mounted member comprising an eccentric rotatably mounted on said rod and disposed in said fork, one end of said eccentric having one or more recesses provided therein for cooperation therewith of a tool for turning the eccentric on the rod.

In witness of the foregoing I affix my signature.

WINFIELD S. NICHOLS.